United States Patent

[11] 3,612,726

[72] Inventor Gordon H. Yowell
 North Branch, Mich.
[21] Appl. No. 40,177
[22] Filed May 25, 1970
[45] Patented Oct. 12, 1971
[73] Assignee Sperry Rand Corporation
 Troy, Mich.

[54] POWER TRANSMISSION
 4 Claims, 2 Drawing Figs.
[52] U.S. Cl. .......................................................... 417/370
[51] Int. Cl. ......................................................... F04b 17/00
[50] Field of Search ............................................. 417/369,
 370, 371, 372, 423, 424, 357, 901

[56] References Cited
 UNITED STATES PATENTS
 2,542,896 2/1951 Brady, Jr. ...................... 417/424
 2,972,308 2/1961 Haggerty ....................... 417/357

Primary Examiner—Robert M. Walker
Attorney—Van Meter and George

ABSTRACT: An electric motor pump unit has a centrifugal pump built into one end bell with an open ball bearing inboard of the impeller and a shaft seal inboard of the bearing. From the outlet of the pump, a small bypass is provided through the ball bearing and around the shaft seal to the pumping inlet for cooling purposes. The bypass is in thermal conducting relation to the air inside the electric motor. The unit is especially suited for driving a high-pressure hydraulic pump, the inlet of which is supercharged by the centrifugal pump of the motor pump unit.

POWER TRANSMISSION

The use of electric motor driven hydraulic pumps in aircraft capable of flying at extremely high altitudes presents problems in cooling the electric motor because of the low air density encountered at high altitudes. It is customary to incorporate in the electric motor a centrifugal boost pump for the purpose of supercharging the inlet of the high-pressure hydraulic pump which forms the principal load for the electric motor.

It is an object of the present invention to improve the cooling arrangements for units of this kind by utilizing a portion of the hydraulic fluid flow which is developed by the supercharging pump as a medium for cooling the electric motor and for lubricating its bearings.

The invention consists in an electric motor pump unit having a stator with end bells and a rotor including a shaft with antifriction bearings in the end bells supporting the shaft, a centrifugal pump positioned in one of the end bells and having an impeller secured to the shaft outwardly of the bearing, a shaft seal in the end bell positioned inwardly of the bearing, inlet and outlet passages for the pump, and means forming a bypass path from the outlet passage to the inlet passage, one portion of this bypass lying within the bearing whereby the bearing is lubricated and the shaft seal is cooled by the liquid being pumped.

Figure 1:
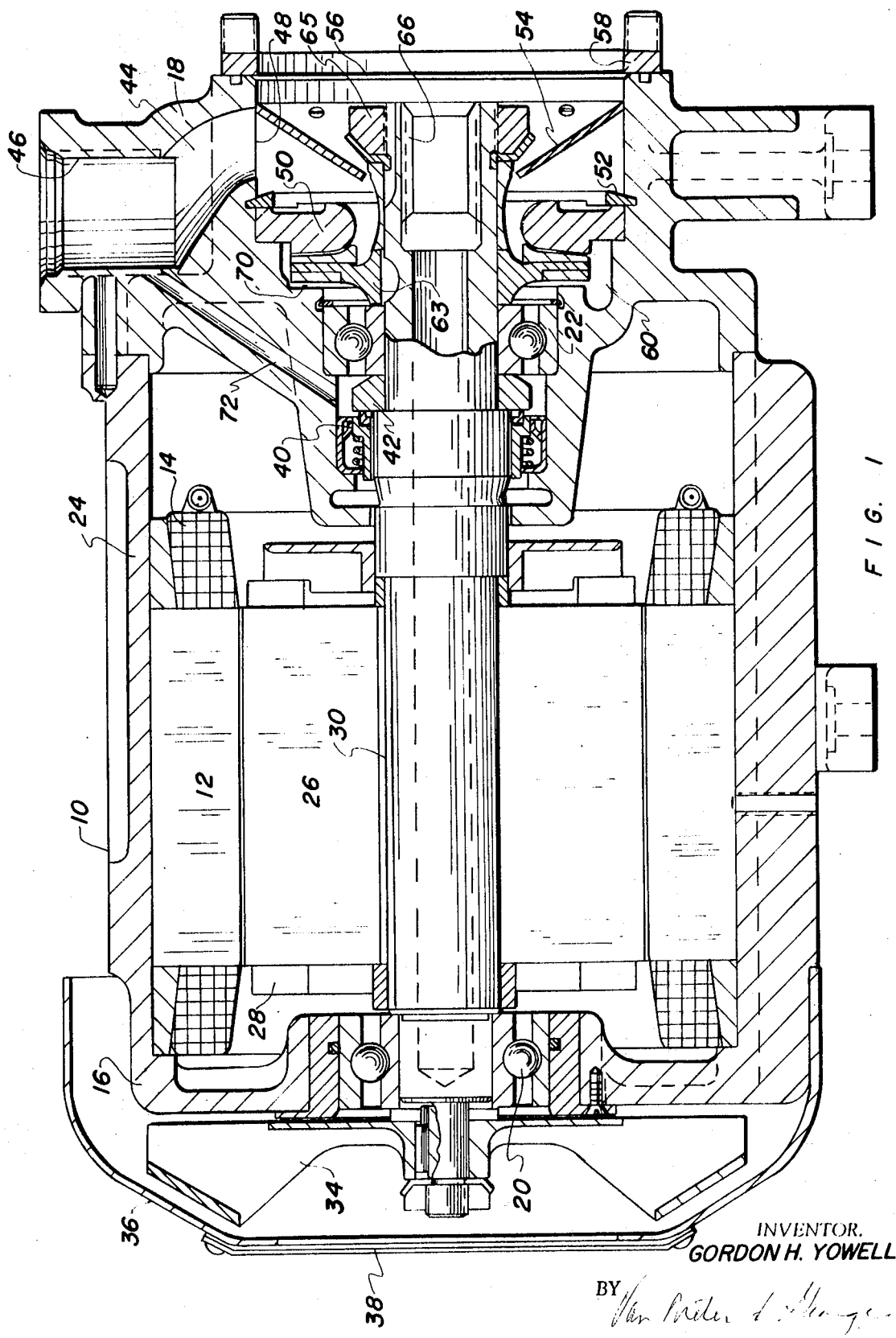
FIG. 1 is a longitudinal sectional view of a motor pump unit incorporating a preferred form of the present invention.

The motor pump unit comprises a motor 10, the stator of which includes the usual magnetic laminations 12, windings 14, end bells 16 and 18, and bearings 20 and 22. The motor illustrated is constructed as an explosion proof type having a finned tubular housing 24 extending between the end bells 16 and 18. The rotor of the motor includes magnetic laminations 26 and induction windings 28 mounted on a shaft 30 which is journaled in the bearings 20 and 22. The left end of shaft 30 carries a cooling fan 34 which is mounted within a shroud 36 having an input screen 38 and which directs cooling air along the outside of the sleeve 24 in contact with the cooling fins. The same arrangement of fan may be utilized in an open-type motor just as well as in an explosion proof type.

The right-hand end bell 18 carries a shaft seal 40 mounted inboard of the bearing 22 and cooperating with a rotating face member 42 fixed on the shaft 30. The end bell 18 is formed to constitute the housing of a centrifugal pump and includes an inlet passage 44 having a terminal connection 46. The passage 44 leads to a large bore 48 in which are pressed a bulkhead 50 retained by a snap ring 52 and a conical flow deflector 54. For shipping purposes, the bore 48 may be closed by a temporary cap 56 secured by the bolted-on ring 58. Inwardly of the bulkhead 50 there is formed a pumping cavity which includes an outlet scroll 60 indicated in dotted lines in FIG. 2 and leading through a passage 62 to an outlet terminal 64.

Figure 2:
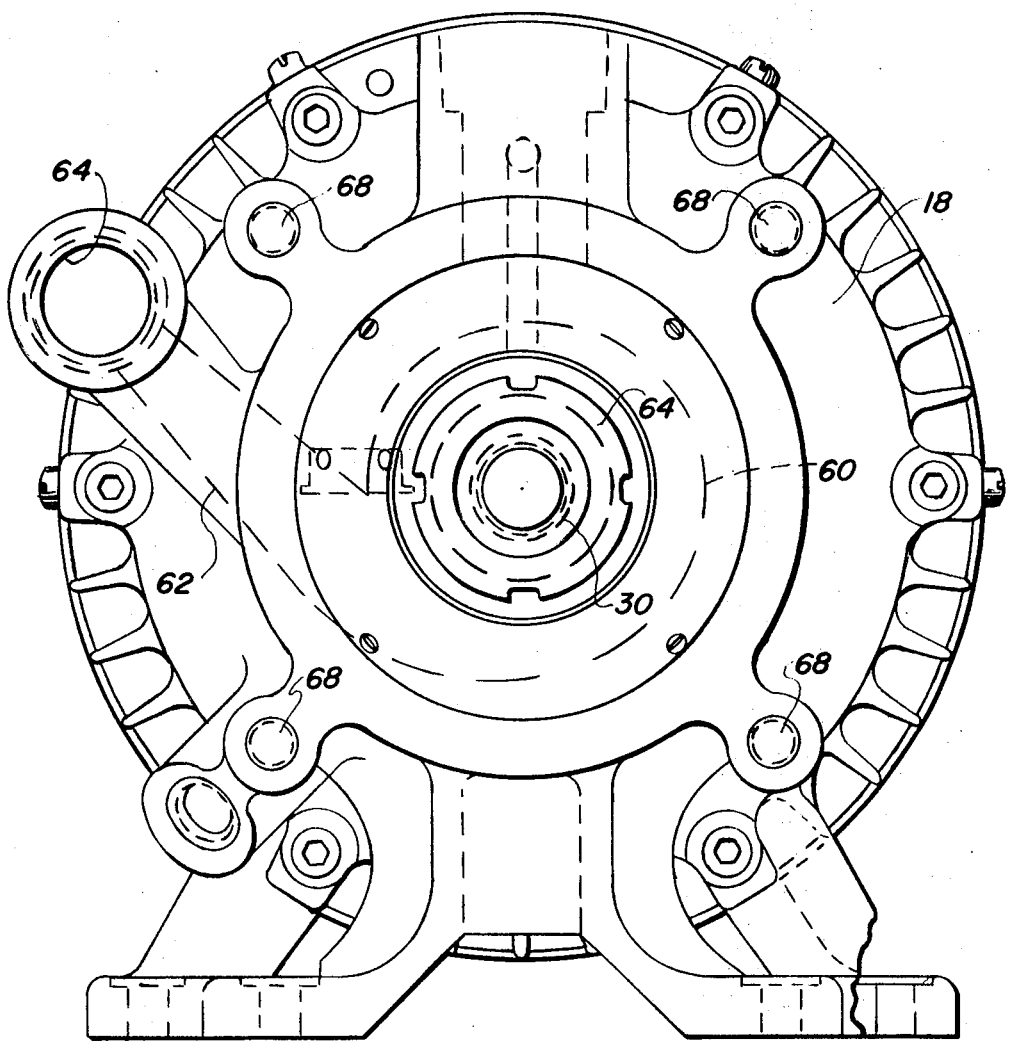
FIG. 2 is an end view of the pump of FIG. 1.

Mounted on the shaft 30 outboard of the bearing 22 is a centrifugal pump impeller 63 which operates within the pumping cavity to deliver hydraulic fluid to the scroll 60. A nut 65 serves to hold the rotor 63, the inner race of the bearing 22 and the seal face 42 in position on the shaft. An internal spline 66 is provided for the purpose of receiving the drive shaft of a high-pressure hydraulic pump or other load which may be secured to the end bell 18 by the mounting studs 68 (FIG. 2). The outlet terminal 64 faces toward any pump which may be thus mounted and by the provision of a suitable push-on or other connection to its inlet may receive output fluid from the centrifugal pump directly.

For the purpose of cooling the shaft seal and lubricating the bearing 22 as well as for cooling the air inside the motor, a small flow is diverted from the outlet of the centrifugal pump back to its inlet through a bypass path. This bypass passage starts at the deliberate clearance which is formed at 70 between the left-hand face of the impeller 63 and the adjacent wall of the pumping chamber. This permits a small leakage of pumped fluid to flow inwardly to the bearing 22 and on through the space between its balls to passover and adjacent to the shaft seal 40–42. From there, a passage 72 formed in the end bell 18 leads this cooling fluid back to the inlet passage 44. The passage 72 lies within a wall of the end bell which is in thermal conducting relationship to the air within the electric motor and serves to assist in cooling this, the hotter end of the motor. Since the temperatures at very high altitudes are extremely low, the hydraulic fluid entering the inlet 46 from the usual reservoir is at a very low temperature and because of its higher specific heat and higher density as compared to air, considerable effective cooling is accomplished in this way. Preferably a plurality of passages 72 are formed in the end bell to increase the cooling effect.

I claim:

1. An electric motor and pump unit comprising a stator including end bells; a rotor including a shaft; antifriction bearings in the end bells supporting the shaft; a centrifugal pump positioned in one of the end bells and having an impeller secured to the shaft outwardly of the bearings; a shaft seal in the end bell positioned inwardly of the bearing; inlet and outlet passages for the pump, and means forming a bypass path from the outlet passage to the inlet passage, one portion of the bypass lying within the bearing whereby the bearing is lubricated and the shaft seal is cooled by the liquid being pumped.

2. A unit as defined in claim 1 wherein the bypass has a portion in thermal conducting relation to the air inside the motor.

3. A unit as defined in claim 2 wherein the motor has a fan at the end opposite the pump to blow air along the stator toward said portion of the bypass.

4. A unit as defined in claim 1 including means on the one end bell for mounting a hydraulic pump including a frame connection and a fluid outlet terminal, both in the one end bell, and a shaft connection.